June 29, 1943.  H. H. ROBBINS  2,322,970
TRANSMISSION SYNCHRONIZER
Filed March 14, 1938
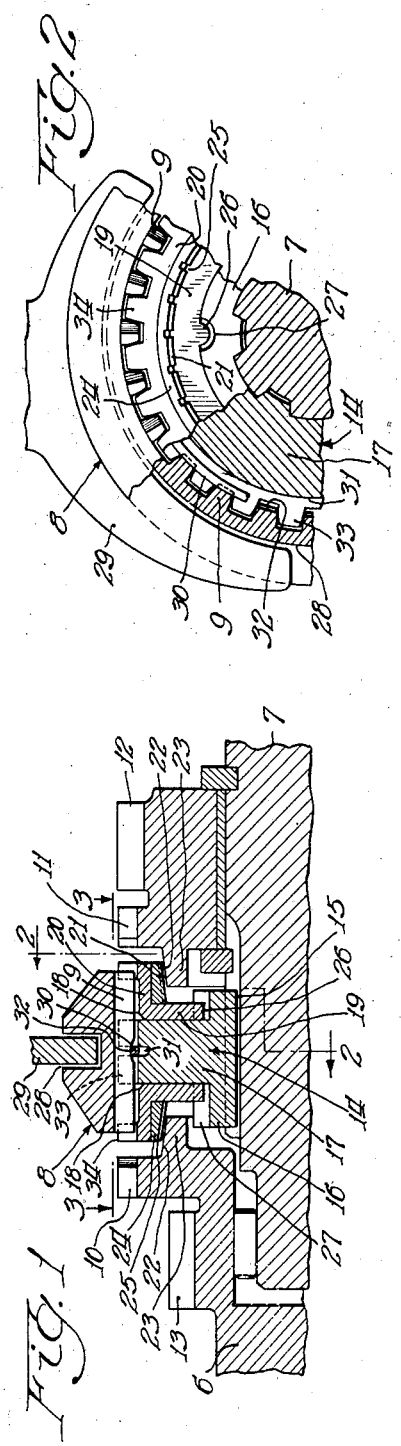
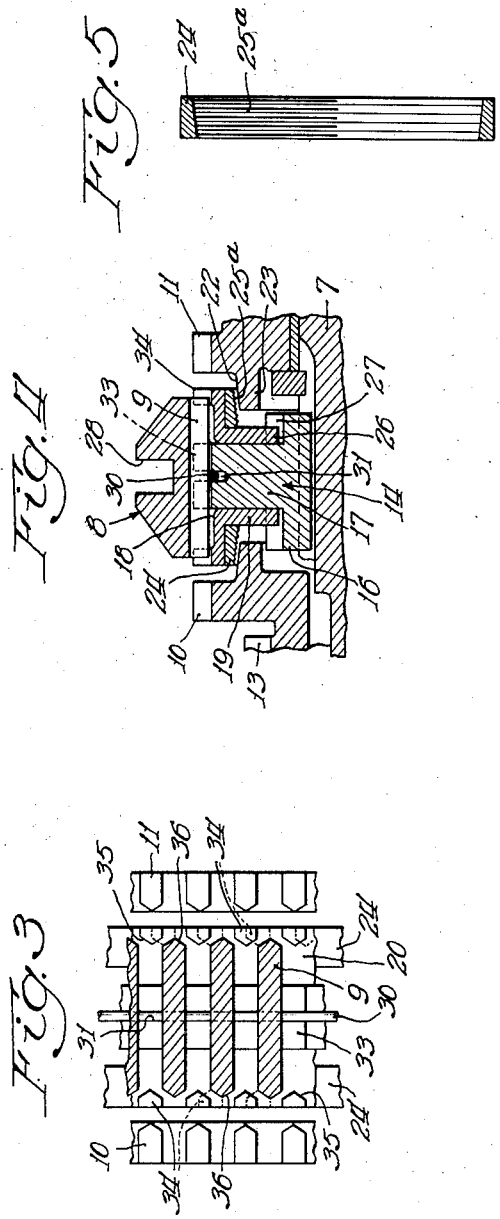
Inventor:
Henry H. Robbins
By: Edward C. Gritzbaugh
Atty.

Patented June 29, 1943

2,322,970

UNITED STATES PATENT OFFICE 2,322,970

TRANSMISSION SYNCHRONIZER

Henry H. Robbins, Muncie, Ind., assignor to Borg-Warner Corporation, Chicago, Ill., a corporation of Illinois Application March 14, 1938, Serial No. 195,740

21 Claims. (Cl. 192—53)

My invention relates to transmissions of the type employed, for example, in motor vehicles wherein there is provided means for effecting synchronization of a pair or pairs of torque-transmitting members preparatory to connecting said members in positive drive engagement with each other. The invention is particularly directed to synchronizing transmissions of the type wherein the synchronizing means comprises friction clutch elements drivingly associated with the respective torque-transmitting members and adapted to be moved into engagement with each other in the initial stage of the shifting movement, and wherein there is incorporated so-called "blocker" mechanism for preventing the positive drive engagement of the members prior to the time that synchronization is effected.

An object of my invention is to provide an improved synchronizing transmission wherein one of the synchronizer elements is in the form of a ring having a circumferentially oscillatable and axially shiftable connection with one of the torque transmitting members allowing the ring to be biased to a position in which it blocks axial advance of the movable positive drive member until synchronization is substantially complete. The invention further aims to provide a novel and improved lost motion oscillatable connection between the synchronizer ring and the member upon which it is mounted, which is extremely simple and inexpensive in construction. To this end, the invention contemplates the provision of a lost motion connection between the synchronizer element and the hub element in the form of a lug on one of said elements projecting radially into a recess in the other element.

Another object of the invention is to provide novel and improved thrust transmitting means for transmitting axial thrust from a shiftable element of the mechanism to the synchronizer element, which thrust transmitting means is exceedingly simple and inexpensive in construction, and yet more effective, certain and durable in operation. To this end, the thrust transmitting element is in the form of a simple split ring of spring material, encircling one of the torque-transmitting members and frictionally engaged against the inner faces of the clutch teeth or internal splines by means of which the shiftable element, encircling the said one torque-transmitting member, is splined thereto so as to be drivingly engaged therewith and axially movable with respect thereto. The split ring is adapted to engage the faces of the shiftable clutch element teeth under its own expanding force, being biased under compression when inserted into the interior of the shiftable clutch element. It is arranged to positively transmit axial movement to the synchronizer element as, for example, by being mounted in a peripheral groove in the said one torque-transmitting member which in turn is arranged to axially abut the synchronizer element.

Other objects, the advantages and uses of the invention will become apparent after reading the following specification and claims, and after consideration of the drawing forming a part of the specification, wherein:

Fig. 1 is an axial sectional view through a portion of a transmission embodying the invention;

Fig. 2 is a partially sectional and partially elevational view taken transversely through the mechanism shown in Fig. 1, as roughly indicated by the line 2—2 of Fig. 1;

Fig. 3 is a horizontal sectional view taken as indicated by the line 3—3 of Fig. 1;

Fig. 4 is an axial sectional view similar to Fig. 1, illustrating a modification of the invention; and Fig. 5 is a detail axial sectional view of one of the synchronizer clutch facings of Fig. 4.

I have selected, as illustrative of one form in which the present invention may be embodied, a transmission mechanism of the general type illustrated and described in the patent of John C. Buchanan, No. 2,129,342, issued September 6, 1938, wherein a positive drive connection may be established between torque-transmitting members comprising a drive shaft 6 and a driven shaft 7, either in direct drive one-to-one ratio, or in a reduced gear ratio, by axially shifting a movable clutch element, designated generally at 8, so that its clutch teeth 9 move into positive clutching engagement with clutch teeth 10 formed on the drive shaft 6, or with clutch teeth 11 formed on a torque-transmitting member in the form of a gear 12 journalled on the shaft 7 and in constant reduction geared relationship with the drive shaft 6 through the medium of a counter-gear assembly, such as is illustrated in said Patent No. 2,129,342 including gears (not shown) meshing with the gear 12 and a gear 13 formed on the shaft 6, respectively.

The movable clutch element 8 encircles and is splined upon the periphery of a torque-transmitting member 14 by means of the teeth 9 meshing with splines 33 on the member 14. The latter in turn is splined, as at 15, on the shaft 7. Thus the movable clutch element 8 is drivingly connected to the shaft 7 while free to shift axially, and the hub 14 is likewise free to shift axially for purposes which will be hereinafter more fully pointed out. Upon being shifted into clutching engagement with the clutch teeth 10, the movable clutch element 8 will receive rotative movement therefrom and transmit it in direct one-to-one ratio through the hub 14 to the driven shaft 7. Upon being shifted into clutching engagement with the clutch teeth 11 of the torque-transmitting member 12, the movable clutch element 8 will receive rotative movement from the shaft 6 through the reduction gearing including the gears 12 and 13 and the counter-gear assembly so as to transmit rotation to the shaft 7 at a reduced rate of speed.

The movable clutch element 8 is provided with a peripheral groove 28 adapted to receive a shifting fork 29 of a conventional shifting mechanism.

The torque-transmitting member 14 includes a hub portion 16 and a radially extending body portion 17 of disc-shape. I provide a pair of annular synchronizer elements 18 each including a mounting ring portion 19 encircling a respective projecting end portion of the hub 16 and axially abutting against a side face of the body portion 17 of the torque-transmitting member 14. From the peripheries of the mounting ring portions 19, rim portions 20 extend axially away from the torque-transmitting member 14. The rim portions 20 are provided interiorly with friction clutch faces 21 which may be of conventional conical form, adapted to coact with corresponding faces 22 on friction clutch elements 23 carried by or formed integrally with the drive shaft 6 and torque-transmitting member 12, respectively. The faces 21 of the synchronizer element may be formed either integrally or, as is preferable, by means of annular friction facing inserts 24 of a selected material such as, for example, bronze.

Formed in the clutch faces 21 or 22, preferably the faces 21, as shown, are a series of parallel or substantially parallel grooves 25, for the purpose of breaking or dissipating oil films which otherwise tend to form between the clutch faces and to interfere with their proper cooperation. The grooves 25 divide the clutch faces into a plurality of sections each having a wiping edge formed by the junctions between the face sections and side walls of the grooves 25, whereby as the face 21 rotates with respect to the face 22, these wiping edges will tend to scrape the oil into the grooves and establish a much more rapid metal to metal contact than would be possible with plain unserrated faces.

While I prefer to employ the form illustrated in Fig. 1, the oil film breaking grooves may take other forms. For example, the grooves may be disposed in helical or threaded formation, such as is illustrated, for example, in the pending application Serial No. 504,084, filed jointly by Otto E. Fishburn and myself on December 22, 1930, and in accordance with the well known practice of helically grooving or threading the surface of one of two conical friction clutch faces for the purpose of securing a non-slipping clutching engagement where oil films are present, as disclosed, for example, in U. S. Patent No. 1,102,402, issued July 7, 1914, to W. S. Gubelman, and U. S. Patent No. 1,657,265, issued January 24, 1928, to Hans Ludwig. Such a helical groove construction is illustrated in Figs. 4 and 5 of the drawing herein, wherein the helical grooves on the interior of the facing 24, are indicated at 25a. For most rapid clutching action, the grooves are of course relatively fine and closely spaced as indicated, and may be in the form of a standard threaded construction such as is commonly used in the threading of pipes, bolts, etc., wherein the distance between adjacent threads or grooves is, for example, .025 inch. Such standard threads are of course, as is well known, substantially V-shaped in cross section with the edges of the threads flattened off, i. e., the grooves do not meet each other but are separated by sections of the surface of the friction faces 21.

When the movable clutch element 8 is moved axially, it is adapted, in the initial stage of such axial movement, to transmit axial shifting movement to the torque-transmitting member 14 which in turn will move a synchronizer element 18 into engagement with a corresponding friction clutch element 23.

Axial thrust is transmitted from the movable clutch element 8 to the torque-transmitting member 14 by means of an annular ring 30 of spring material seated in an annular groove 31 formed in the periphery of the body portion 17 of the torque-transmitting member 14, and biased under compression in yielding frictional engagement with the inner faces of the teeth 9 of the clutch element 8. An annularly arranged series of notches 32 may be provided in the teeth 9, to receive the ring 30 when the shiftable clutch element is in a central or neutral position, as shown in Fig. 1.

It may be noted that the groove 31 divides the splines 33 into spaced annular rows of spline sections between which the ring 30 is engaged so as to positively transmit axial movement to the torque-transmitting member 14 when urged to do so by the yielding engagement with the shifting clutch element 8.

The mounting ring portions 19 of the synchronizer elements 18 are provided with lost motion drive connections with the torque-transmitting member 14 in the form of lugs 26 projecting radially inwardly from the inner peripheries of the mounting rings 19 and received in axial notches 27 formed in the projecting portions of the hub 16. The notches 27 are wider than the lugs 26 so as to allow limited relative oscillating movement between the synchronizer elements 18 and the torque-transmitting member 14.

Projecting radially outwardly from the extremities of the rim portion 20 of the synchronizer elements 18 are a series of blocker teeth 34 between which the teeth 9 of the movable clutch element 8 must move in order to reach the clutch teeth 10 or 11 with which positive drive engagement is to be established. The blocker teeth 34 may have their ends facing the teeth 9 chamfered, as at 35, and the ends of the teeth 9 may be correspondingly chamfered, as at 36, so that movement of the movable clutch element 8 in the direction of the relative fixed clutch teeth 11 or 10 may cause the registering chamfered surfaces 35 and 36 of the blocker teeth and clutch teeth respectively, to contact along surfaces disposed angularly with respect to the axis of rotation of the parts at such times as when the teeth 34 are not in direct end to end register with the splines 33 on the torque-transmitting member 14. This condition will exist whenever one of the two torque-transmitting members to be interconnected, such as the member 14 and the gear 12, is rotating at a speed different from that of the other of said members, so as to cause the synchronizer ring 18 to move to one of the two limits of its lost motion drive connection with the torque-transmitting member 14 as a result of the initial engagement of the clutch faces 21 and 22.

As the members attain synchronization, however, there will be a momentary reversal of the relative rotation of one member, relative to the other, such as to cause the synchronizer ring to move toward the other limit of its lost motion connection, and in so moving, it will reach a position wherein the blocker teeth 34 will momentarily register with the teeth 33 so as to allow the teeth 9 of the movable clutch element 8 to move into the spaces between the blocker teeth 34, and thence on into clutching engagement with the teeth 10 or 11, as the case may be. This movement is aided by the chamfered surfaces 35 and 36, in a well known manner.

In making this movement, the movable clutch element 8 will move relative to the torque-transmitting member 14 which has been stopped from further axial movement by the engagement of the synchronizer clutch faces 21 and 22. In thus moving relative to the torque-transmitting member 14, the shiftable clutch element 8 will slightly compress the thrust ring 30, causing the latter to slide out of the notches 32 and into engagement with the straight portions of the inner faces of the teeth 9. These straight portions of the teeth 9 will continue to exert a frictional drag against the ring 30 such as to maintain the proper pressure against the synchronizer element.

While it may shift axially with respect to the shiftable clutch element 8, the thrust ring remains at all times in engagement with the interior of the ring, thus maintaining at all times the frictional drag engagement with the inner faces of the teeth 9.

If desired, the notches 32 may be dispensed with, and the thrust of the shiftable clutch element 8 transmitted through the torque-transmitting member 14 solely by the frictional drag of the inner faces of the teeth 9 against the periphery of the ring 30. Such a construction is shown in Fig. 4.

I claim:

1. In a synchronizing transmission, a pair of coaxial torque-transmitting members, a movable jaw clutch element carried by one of said members and adapted to be moved axially into engagement with a jaw clutch element carried by the other member thus to establish a positive drive connection between said members, a synchronizer element driven by said one member and adapted to be moved axially into frictional driving engagement with a friction clutch element carried by said other member so as to effect synchronization of said members, and an annular thrust member of spring material arranged coaxially with said torque-transmitting members, having an axial thrust transmitting connection with said synchronizer element and being biased under compression in radially outwardly directed yielding engagement with the interior of said movable clutch element, whereby to transmit axial movement from said movable clutch element to said synchronizer element.

2. A transmission as defined in claim 1, wherein said annular thrust member is adapted to yield axially with respect to said movable clutch element during shifting of the latter, but remains at all times in engagement with the interior thereof.

3. In a synchronizing transmission, a pair of coaxial torque-transmitting members, a movable jaw clutch element carried by one of said members and adapted to be moved axially into engagement with a jaw clutch element carried by the other member thus to establish a positive drive connection between said members, a synchronizer element driven by said one member and adapted to be moved axially into frictional driving engagement with a friction clutch element carried by said other member so as to effect synchronization of said members, said one torque-transmitting member having in its periphery a radially outwardly opening annular groove, and a split ring of spring material seated in said groove and resiliently engaging the interior of said movable clutch element under its own expanding force, whereby to transmit axial movement from said movable clutch element to said synchronizer element through the medium of said one torque-transmitting member.

4. A transmission as defined in claim 1, wherein said movable clutch member has in its said interior a depression in which said annular thrust member is initially engaged.

5. In a synchronizing transmission, a pair of coaxial torque-transmitting members, a movable jaw clutch element having internal teeth whereby it is splined in encircling relationship upon one of said members, and adapted to be moved axially to bring said teeth into clutching engagement with cooperating jaw clutch teeth on the other member, thus to establish a positive drive connection between said members, a synchronizer element driven by said one member, having an internal friction clutch face, and adapted to be moved axially into frictional driving engagement with a cooperating clutch face on said other member so as to effect synchronization of said members, and an annular thrust member of spring material arranged coaxially with said torque-transmitting members, having an axial thrust transmitting connection with said synchronizer element and being biased under compression in radially outwardly directed yielding engagement with the inner faces of the teeth of said movable clutch element, whereby to transmit axial movement from said movable clutch element to said synchronizer element.

6. A transmission as defined in claim 5, wherein said annular thrust member is adapted to yield axially with respect to said movable clutch element during shifting of the latter, but remains at all times in engagement with the interior of the teeth of said movable clutch element.

7. In a synchronizing transmission, a pair of coaxial torque-transmitting members, a movable jaw clutch element having internal teeth whereby it is splined in encircling relationship upon one of said members, and adapted to be moved axially to bring said teeth into clutching engagement with cooperating jaw clutch teeth on the other member, thus to establish a positive drive connection between said members, a synchronizer element driven by said one member, having an internal friction clutch face, and adapted to be moved axially into frictional driving engagement with a cooperating clutch face on said other member so as to effect synchronization of said members, and a split ring of spring material arranged coaxially with said torque-transmitting members, having an axial thrust transmitting connection with said synchronizer element and being biased under compression in radially outwardly directed yielding engagement with the inner faces of the teeth of said movable clutch element, whereby to transmit axial movement from said movable clutch element to said synchronizer element.

8. In a transmission synchronizer, a torque-transmitting member, a driven member arranged coaxially therewith, a movable clutch element encircling said torque-transmitting member and having internal teeth cooperating with splines on said member to form a splined connection therewith whereby it may be moved axially to bring said teeth into engagement with a jaw clutch element carried by said driven member thus to establish a positive drive connection between said members, a synchronizer element having an oscillatory lost motion driving connection with said torque transmitting member and having an internal friction clutch face adapted to be moved axially into frictional driving engagement with a cooperating external clutch face on said other member so as to effect synchronization of said members, said clutch faces being conical and one of said faces having oil grooves therein for reducing the oil film otherwise tending to form between said faces, and a split ring thrust member of spring material encircling said torque-transmitting member, having an axial thrust transmitting connection with said synchronizer element and being biased under compression in radially outwardly directed yielding engagement with the interior faces of the teeth of said movable clutch element, whereby to transmit axial movement from said movable clutch element to said synchronizer element.

9. A transmission as defined in claim 8, wherein the grooves are helical in form.

10. A transmission as defined in claim 8, wherein the grooves are helical in form and closely spaced to form fine threads in said faces.

11. In a synchronizing transmission, a pair of torque-transmitting members mounted in axial alignment, a movable jaw clutch element carried by one of said members and adapted to be moved axially into engagement with a jaw clutch element carried by the other member thus to establish a positive drive connection between said members, a synchronizer element having a lost motion circumferentially oscillatable and axially shiftable connection with said one member and adapted to be moved into frictional driving engagement with a friction clutch element carried by said other member so as to effect synchronization of said members, and blocker means carried by said synchronizer element and adapted to be shifted into blocking relation to said movable clutch element by the initial engagement between said synchronizer and friction clutch elements, whereby to prevent said movable clutch element moving into positive clutching engagement with said other torque-transmitting member until synchronization is substantially complete.

12. In a synchronizing transmission, a pair of coaxial torque transmitting members, jaw and friction clutch members drivingly associated with one of said torque transmitting members, a hub element mounted upon the other torque transmitting member, a jaw clutch sleeve encircling and drivingly connected to said hub element, and axially shiftable thereon into positive clutching engagement with said jaw clutch member so as to establish a positive drive connection between said shafts, an annular synchronizer element having a friction clutch face for coaction with said friction clutch member, one of said elements being provided with a radially projecting lug and the other of said elements providing an axially extending space into which said lug extends to form a lost motion circumferentially oscillatable connection between said elements, and blocker means carried by said synchronizer element and adapted as a result of frictional engagement between said synchronizer element and said friction clutch member to be biased in a position blocking axial advance of said sleeve to positive clutching position until synchronization is substantially complete.

13. In a synchronizing transmission, a pair of coaxial torque transmitting members, jaw and friction clutch members drivingly associated with one of said torque transmitting members, a hub element mounted upon the other torque transmitting member, a jaw clutch sleeve encircling, drivingly connected to and axially shiftable upon the periphery of said hub element into positive clutching engagement with said jaw clutch member so as to establish a positive drive connection between said torque transmitting members, and a synchronizer ring having a lost motion circumferentially oscillatable and axially shiftable connection with said hub element, adapted under axial pressure to establish a synchronizing frictional driving connection with said friction clutch member, and including blocking means adapted as the result of frictional engagement between said ring and said friction clutch member to be biased in a position blocking axial advance of said sleeve to positive clutching position until synchronization is substantially complete.

14. In a synchronizing transmission, a pair of coaxial torque transmitting members, jaw and friction clutch members drivingly associated with one of said members, said jaw clutch member and the other of the said torque transmitting members being formed with alignable peripheral teeth, a jaw clutch sleeve encircling and having internal teeth in sliding splined engagement with the teeth of said other torque transmitting member, and shiftable axially to bring said internal teeth into positive clutching engagement with the teeth of said jaw clutch member, thus to establish a positive drive connection between said members, and a synchronizer ring having a lost motion circumferentially oscillatable and axially shiftable connection with said other torque transmitting member, adapted under axial pressure to establish frictional synchronizing engagement with said friction clutch member, and including blocker means adapted as a result of frictional engagement between said ring and said friction clutch member to be biased in a position blocking axial advance of said sleeve until synchronization is substantially complete.

15. A synchronizing transmission as defined in claim 12, wherein said lug is formed integrally with said synchronizer element and projects radially inwardly into said space, the latter being formed in said hub element.

16. In a synchronizing transmission, a torque transmitting member, jaw and friction clutch members drivingly associated therewith, a torque transmitting element coaxial with said members, said element and said jaw clutch member being formed with alignable peripheral teeth, a jaw clutch sleeve encircling and having internal teeth in sliding splined engagement with the teeth of said element, and shiftable axially to bring said internal teeth into positive clutching engagement with the teeth of said jaw clutch member, thus to establish a positive drive connection between said torque transmitting element and member, and an annular synchronizer element having a friction clutch face for coaction with said friction clutch member, one of said elements being provided with a lug and the other of said elements having a space into which said lug extends to form a lost motion circumferentially oscillatable driving connection between said elements, and blocker teeth carried by said synchronizer element, alignable with the internal teeth of said sleeve, and adapted as a result of frictional engagement between said synchronizer element and said friction clutch member, to be biased in a position blocking axial advance of said sleeve to positive clutching position until synchronization is substantially complete.

17. In a synchronizing transmission, coaxial driving members each carrying a set of clutch teeth and a friction clutch element, means drivingly connecting said members together for rotation at different speeds, a driven member adapted to selectively receive a drive from said driving members, a hub structure mounted on said driven member for rotation therewith, a shift device driven with said hub structure and having clutch teeth adapted to selectively clutch with said sets of clutch teeth, a synchronizing control structure disposed between each of said driving members and said hub structure, each of said control structures having a friction clutch part engageable with one of said friction clutch elements and a stop for controlling shift of said shift device, means drivingly connecting said control structures with said hub structure for accommodating axial and rotative movements of said control structures relative to said hub structure, and means releasably connecting said shift device with said control structures for selective shift of said control structures by said shift device to effect selective engagement of said friction clutch parts respectively with said friction clutch elements, said releasable connecting means accommodating additional shift of said shift device relative to said control devices for effecting selective clutching of the clutch teeth of the shift device with said sets of clutch teeth.

18. A synchronizing transmission according to the preceding claim, wherein the releasable connecting means comprises an element releasably engaging said shift device and adapted for selective axial displacements in transmitting shifting movement from said shift device selectively to said control structures.

19. In a synchronizing transmission, coaxial driving members each carrying a set of clutch teeth and a friction clutch element, means drivingly connecting said members for rotation at different speeds, a driven member adapted to selectively receive a drive from said driving members, a hub structure mounted on said driven member for rotation therewith, a shiftable sleeve splined upon said hub structure and having clutch teeth adapted to selectively clutch with said sets of clutch teeth, a synchronizing control structure disposed between each of said driving members and said hub structure, each of said control structures having a friction clutch part engageable with one of said friction clutch elements and a stop for controlling shift of said shift device, means drivingly connecting said control structures with said hub structure for accommodating axial and rotative movement of said control structures relative to said hub structure, and an expansion ring releasably engaging the interior of said shiftable sleeve so as to receive shifting thrust therefrom and adapted to transmit such thrust to either of said control structures selectively so as to effect selective engagement of said friction clutch parts respectively with said friction clutch elements, said expansion ring accommodating additional shift of said shift device relative to said control devices for effecting selective clutching of the clutch teeth of the shift device with said sets of clutch teeth.

20. In a synchronizing mechanism, two relatively rotatable parts to be clutched one having a set of clutch teeth and a friction clutching member rotating therewith and the other having a friction clutching element rotating therewith and adapted for displacement to engage the friction clutching member, the last said part having external splines, a hollow shift sleeve having at least a portion of its interior surface splined for sliding fit with said external splines, and a radially expanding ring in releasable thrust receiving engagement with the interior of said shift sleeve for shift therewith to effect said displacement of said friction clutching element and accommodate further shift of said shift sleeve to clutch the latter with said set of clutch teeth.

21. In a synchronizing transmission, a pair of coaxial rotatable parts to be drivingly connected, jaw and friction clutch members drivingly associated with one of said parts, a hub element mounted upon the other part, a jaw clutch sleeve encircling, drivingly connected to and axially shiftable upon the periphery of said hub element into positive clutching engagement with said jaw clutch members so as to establish a positive drive connection between said parts, a synchronizer element adapted under axial pressure to establish a synchronizing frictional driving connection with said friction clutch member, and including blocking means adapted as the result of frictional engagement between said synchronizer element and friction clutch member to be biased in a position blocking axial advance of said sleeve, one of said elements being provided with a lug and the other of said elements having a space into which said lug extends to form a lost motion circumferentially oscillatable and axially shiftable driving connection between said elements, and a thrust member in releasable thrust receiving engagement with the interior of said sleeve and adapted to transmit to said synchronizer element the thrust received from said sleeve during shifting of the latter.

HENRY H. ROBBINS.